United States Patent
Andoji et al.

(10) Patent No.: US 8,938,379 B2
(45) Date of Patent: Jan. 20, 2015

(54) SYSTEMS, METHODS, AND APPARATUS FOR PREDICTING IMPACT ON A PIPELINE DELIVERY INFRASTRUCTURE

(75) Inventors: Kavitha Andoji, Hyderabad (IN); Uday Kumar Dubasi, Hyderabad (IN); Ganesh Kumar Somesula, Hyderabad (IN)

(73) Assignee: General Electric Company, Schenectady, NY (US)

( * ) Notice: Subject to any disclaimer, the term of this patent is extended or adjusted under 35 U.S.C. 154(b) by 196 days.

(21) Appl. No.: 13/194,467

(22) Filed: Jul. 29, 2011

(65) Prior Publication Data

US 2013/0030778 A1  Jan. 31, 2013

(51) Int. Cl.
*G06Q 50/06* (2012.01)
*G05D 7/00* (2006.01)
*G06F 17/50* (2006.01)
*G06Q 10/06* (2012.01)

(52) U.S. Cl.
CPC .............. *G06Q 50/06* (2013.01); *G06Q 10/06* (2013.01)
USPC ................................. 703/9; 703/6; 700/282

(58) Field of Classification Search
CPC ............ F17D 1/00; F17D 1/005; F17D 1/04; F17D 1/08; F17D 3/01; G06Q 50/06; G06Q 10/04; G06Q 10/0639; G06F 17/509; G06F 17/30241; G06F 17/50; G06F 17/5004; G06F 17/5009; G06F 2217/16; G06F 2217/34; G06F 19/00; F15B 19/007; G05B 17/02; G06G 7/50; G06G 7/62; G06G 7/63; G06G 7/635; Y02E 60/34
See application file for complete search history.

(56) References Cited

U.S. PATENT DOCUMENTS

| | | | |
|---|---|---|---|
| 5,414,641 A * | 5/1995 | Shinoaki et al. ................ | 702/47 |
| 6,507,792 B1 * | 1/2003 | Senoo et al. .................... | 702/50 |
| 7,729,875 B2 | 6/2010 | Iwamura et al. | |
| 2002/0042700 A1* | 4/2002 | Giles et al. ........................ | 703/6 |
| 2008/0082215 A1* | 4/2008 | McDowell ..................... | 700/282 |
| 2008/0167825 A1* | 7/2008 | Tarabzouni et al. ............ | 702/36 |
| 2009/0265292 A1* | 10/2009 | Harper ............................ | 706/13 |

OTHER PUBLICATIONS

Bean, Bradley B., PE, GASWorkS™ 9.0: User's Manual, Copyright 2009, retrieved: http://www.b3pe.com/docs/GW90_Manual.pdf.*
Nicolai et al., A System for the Control and Optimum Operation of a Gas Transmission Network, Pipeline Simulation Interest Group (PSIG), PSIG Annual Meeting, Tulsa, OK, Oct. 22-23, 1987.*

(Continued)

*Primary Examiner* — Kandasamy Thangavelu
*Assistant Examiner* — Michael P Healey
(74) *Attorney, Agent, or Firm* — Sutherland Asbill & Brennan LLP (57) ABSTRACT

Certain embodiments of the invention may include systems, methods, and apparatus for predicting impact on a pipeline delivery infrastructure. According to an example embodiment of the invention, a method is provided that can include simulating a pipeline delivery infrastructure; identifying one or more sections in the infrastructure; and forecasting an impact of the infrastructure based on one or more modifications to the infrastructure or on one or more new demand points wherein the forecasting comprises estimating pressures in each of identified one or more sections.

20 Claims, 4 Drawing Sheets

(56) References Cited

OTHER PUBLICATIONS

Woomer, E.D., Basics of High Pressure Measuring and Regulating Station Design: Retrieved: http://help.intellisitesuite.com/Hydrocarbon/papers/1010.pdf on May 2, 2013, Embedded PDF creation date: Mar. 29, 2007.*

Woomer date evidence from Archive.org and Google.com indicating that Woomer (2007) was available online by Jan. 15, 2011 and Jan. 12, 2008, respectively, Created: May 2, 2013.*

Pipeline Management Solutions, Germanischer Lloyd—Service/Product Description, retrieved: http://www.gl-nobledenton.com/assets/downloads/Pipeline_Management_Solutions.pdf, embedded PDF creation date: Dec. 3, 2008.*

Helseth, A. et al., "Reliability modeling of gas and electric power distribution systems; similarities and differences." 9th International Conference on Probabilistic Methods Applied to Power Systems; Stockholm, Sweden. Jun. 2006. (5 pgs.).

* cited by examiner

SYSTEMS, METHODS, AND APPARATUS FOR PREDICTING IMPACT ON A PIPELINE DELIVERY INFRASTRUCTURE

FIELD OF THE INVENTION

This invention generally relates to pipeline delivery infrastructure, and in particular, to predicting or forecasting impact from planned changes to pipeline delivery infrastructure.

BACKGROUND OF THE INVENTION

Gas distribution utilities have planned and unplanned outages, for which customers can have their service interrupted. One of the major challenges for the utility is to provide un-interrupted gas supply, particularly to critical customers. Utilities across the globe share similar issues related to the interruption of the gas supply. Natural disasters, failing equipment, pipeline repairs, pipeline expansions, etc., all present different challenges that can create issues for customers ranging from minor annoyances to catastrophic situations. Reducing or preventing service interruptions also helps the utilities maximize revenue.

BRIEF SUMMARY OF THE INVENTION

Some or all of the above issues may be addressed by certain embodiments of the invention. Certain embodiments of the invention may include systems, methods, and apparatus for predicting impact on a pipeline delivery infrastructure.

According to an example embodiment of the invention, a method is provided that can include simulating a pipeline delivery infrastructure; identifying one or more sections in the infrastructure; and forecasting an impact of the infrastructure based on one or more modifications to the infrastructure or on one or more new demand points wherein the forecasting comprises estimating pressures in each of identified one or more sections.

According to another example embodiment, a system is provided for planning and optimizing a utility delivery infrastructure. The system can include one or more regulating stations; at least one demand point; one or more sections comprising one or more segments; a plurality of valves; a geographical information system (GIS) comprising one or more processors configured to execute computer executable instructions operable for: simulating the pipeline delivery infrastructure; identifying one or more sections in the infrastructure; and forecasting an impact of the infrastructure based on one or more modifications to the infrastructure or on one or more new demand points wherein the forecasting comprises estimating pressures in each of identified one or more sections.

According to another example embodiment, an apparatus is provided for planning and optimizing a utility delivery infrastructure. The apparatus can include a geographical information system (GIS). The GIS can include one or more processors configured to execute computer executable instructions operable for: simulating the pipeline delivery infrastructure, wherein the simulated infrastructure comprises one or more regulating stations, at least one demand point, one or more sections comprising one or more segments, and a plurality of valves, wherein at least two valves are connected to each of the one or more regulating stations; identifying the one or more sections in the infrastructure; estimating pressures in each of identified one or more sections based at least in part on pressure provided by the one or more regulating stations and by states of the plurality of valves in communication with the one or more sections; forecasting an impact of the infrastructure based on one or more modifications to the infrastructure or on one or more new demand points; and providing data associated with the infrastructure based at least in part on one or more of the simulating, the identifying, the estimating, or the forecasting.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Certain embodiments of the invention may enable pipeline operators or utilities to assess scenarios related to delivery of product via a pipeline. Example embodiments of the invention may provide forecasting or prediction of the impact that certain changes in the pipeline may have on customers, or other sections of the pipeline. Example embodiments may provide information that can provide efficient configurations to re-route gas to customers when certain parts of the pipeline are damaged, under repair, or inoperative.

According to certain example embodiments of the invention, optimum sectioning of a gas network may be determined by considering multiple source points, regulators, valves, pipeline sections, demand points, etc. For example, valves may be utilized for isolating some or part of the pipeline network. In accordance with example embodiments of the invention, certain gas distribution network challenges related to outages may be addressed and overcome. For example, primary and secondary gas sources or regulation stations (RS) may be identified for serving customers by certain alternate valve settings and pathways. In example embodiments, the capacity of the serving gas source may be determined for serving the existing load and/or for serving new loads. In example embodiments, available valves or other flow control devices may be evaluated for options to control pressure in segments of the pipeline infrastructure. According to certain example embodiments, existing or predicted demands on the network may be visualized with respect to available or predicted capacity of the source stations, and such visualizations may be utilized for partial or full gas restoration, for increasing customer satisfaction, and/or for better utilization of current infrastructure in order to avoid losses.

To achieve uninterrupted service, and according to example embodiments, the gas distribution network may planned, or may include intelligent valve placing so that demand points can be connected to multiple gas regulating stations and reconfigured via valves to isolate or connect various gas distribution paths. Such efficient sectioning may provide flexibility to keep certain customers supplied while parts of the pipeline are inoperable. In certain example embodiments, mobile gas delivery vehicles may be utilized for providing service to parts of the network where demand points may not be connected to sources. Example embodiments of the invention may be utilized for use with a water network, with some modification based on water domain.

According to example embodiments of the invention, various regulators, valves, pipeline sections, demand points, etc., may be modeled and evaluated in a geographical information system (GIS), and may be utilized for predicting impact on a pipeline delivery infrastructure. Embodiments of the invention will now be described with reference to the accompanying figures and tables.

Figure 1:
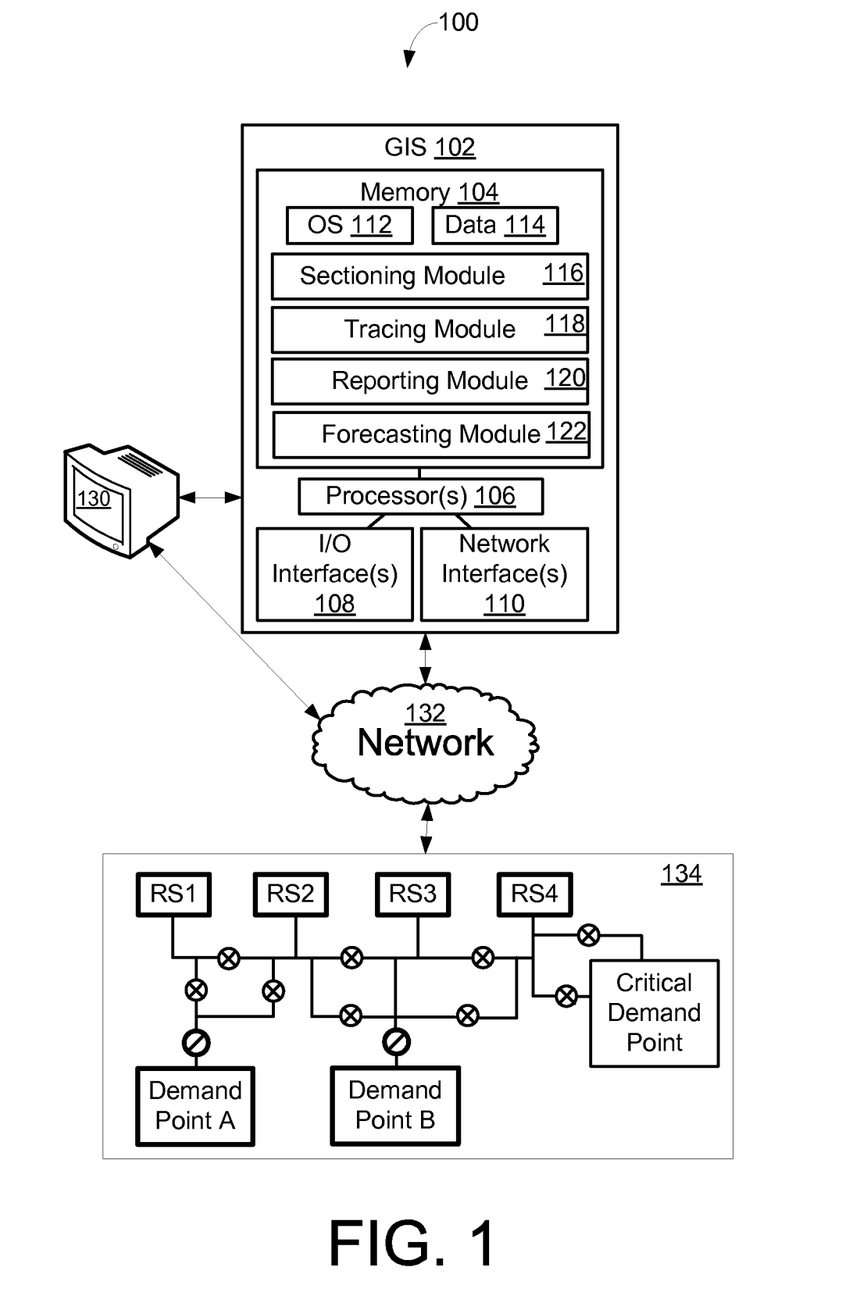
FIG. 1 is a block diagram of an illustrative GIS segmenting system according to an example embodiment of the invention.

FIG. 1 illustrates an example GIS segmenting system 100, according to an example embodiment of the invention. In an example embodiment, a global information system (GIS) 102 may be utilized for modeling, forecasting, tracing, sectioning, etc., in relation to the pipeline infrastructure system 134. For example, the GIS 102 may include a memory 104, one or more processors 106, one or more input/output (I/O) interfaces 108, and one or more network interfaces 110 which may be in communication with a network 132 and/or a workstation 130. In an example embodiment, the memory 104 may include an operating system (OS) 112, data 114, and various machine readable modules that may perform certain functions. For example, the memory 104 may utilize or include a sectioning module 116, a tracing module 118, a reporting module 120, and/or a forecasting module 122. The modules may be utilized to analyze present or future network configurations, determine pressure in certain segments of the pipeline infrastructure system 134, and present the information.

Figure 2A:
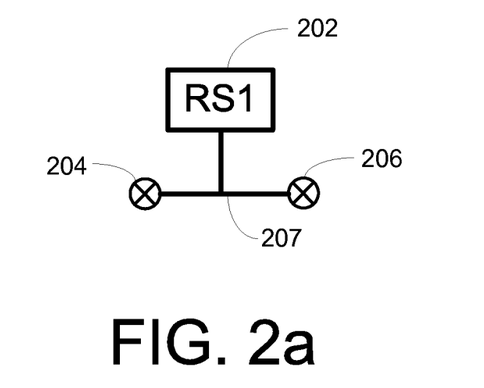
FIG. 2a is a block diagram of an illustrative first regulating station according to an example embodiment of the invention.
Figure 2B:
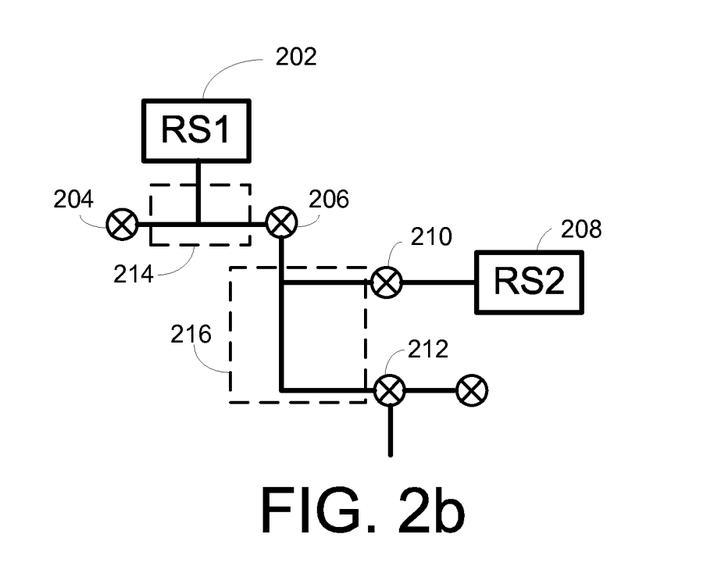
FIG. 2b is a block diagram of an illustrative network with first regulating station, a second regulating station, connecting segments, and valves, according to an example embodiment of the invention.

FIG. 2a depicts an example first regulation station (RS1) 202 in communication with a first valve 204 and a second valve 206 via a pipeline or conduit 207. FIG. 2b depicts a second valve 206 in communication with a second regulation station (RS2) 208 via a third valve 210, which is in communication with the second valve 206. A fourth valve 212 is also indicated to demonstrate the sectioning of the network into a first segment 214 and a second segment 216, where the segments indicate regions of the pipeline network that can be isolated. According to example embodiments of the invention, critical assets, including main pipelines, regulation stations, valves and demand points, may play vital roles in sectioning of any network. For example, in case of a new regulation station, tracing may be done on a given GIS map, and the GIS system may propose possible valve positions and their statuses. According to an example embodiment, valves may be placed based on pressure ranges. According to an example embodiment, sections of the network may be joined by a minimum of two valves. According to an example embodiment, one valve may be closed with one side of the closed valve leading to a demand point and/or to a nearby regulation station and/or to a compressing station.

In an example embodiment, an open valve line may lead to a demand point. In the case of new segmentation of a main pipe, and according to an example embodiment, the GIS system may propose or enforce that a new valve is to be placed between the regulation station and any T-section, as indicated by the third valve 210 in FIG. 2b so that, for example, either RS1 202 or RS2 208 may independently provide gas to a demand point via the fourth valve 212 and the desired regulation station (RS1 202 or RS2 208) may be selected by suitably setting the second valve 206 and the third valve 210.

Figure 3A:
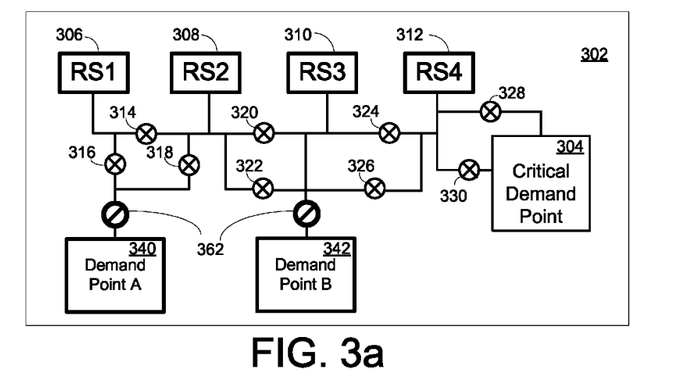
FIG. 3a is a block diagram of an illustrative gas or water delivery network, according to an example embodiment of the invention.
Figure 3B:
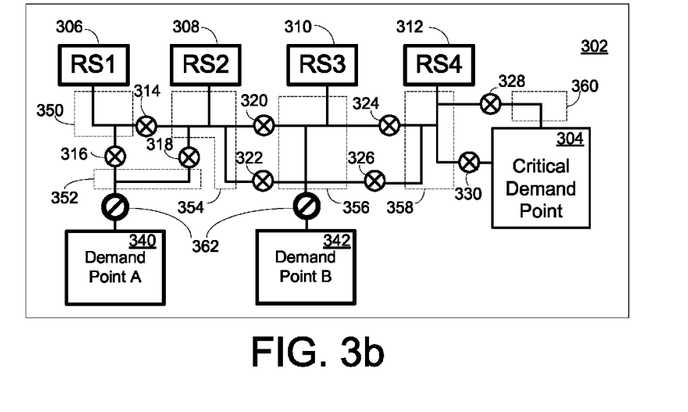
FIG. 3b is a block diagram of an illustrative gas or water delivery network with identified segments, according to an example embodiment of the invention.

FIG. 3a and FIG. 3b depict an example gas or water delivery network 302. The illustrative network 302 can include a critical demand point 304, demand point A 340, demand point B 342, a first regulation station RS1 306, a second regulation station RS2 308, a third regulation station RS3 310, and a fourth regulation station RS4 312. According to example embodiments, the demand points 304, 340, 342 may be connected to the regulation stations 306, 308, 310, 312 by a number of pipe sections and valves 314, 316, 318, 320, 322, 324, 326, 328, 330. In accordance with example embodiments of the invention, certain rules, operations, or processes may be carried out to identify segments 350, 352, 354, 356, 358, 360 of the network 302 where the pipeline sections can be isolated. For example, the first segment 350 includes a pipeline section bounded on one end by the first regulation station RS1 306, and the T-section that terminates on the other end into a first valve 314 and a second valve 316. In accordance with example embodiments, regulation stations 306, 308, 310, 312 are isolated by at least one valve. According to an example embodiment, demand points 340, 342 may include, or may be in communication with, regulating devices 362. For example, the regulating devices 362 may downregulate the pressure in the pipelines to a usable pressure at the demand points 340, 342.

According to example embodiments of the invention, the segments 350, 352, 354, 356, 358, 360 can be identified by the following:

Operation 1: (1) Start tracing from all regulation stations 306, 308, 310, 312. (2) Stop tracing upon encountering a valve 314, 316, 318, 320, 322, 324, 326, 328, 330 or regulating devices 362. (3) Identify the traced pipeline sections.

Operation 2: (1) Start tracing from all regulating devices 362. (2) Stop tracing upon encountering a regulation station 306, 308, 310, 312. (3) Identify the traced pipeline sections.

Operation 3: (1) Start tracing from all regulating devices 362. (2) Stop tracing upon encountering a demand point 304, 340, 342. (3) Identify the traced pipeline sections.

Operation 4: Identify segments 350, 352, 354, 356, 358, 360 of the network 302 as a union of identified and overlapped traced pipeline sections. For example, Operation 1 above may identify a first section of a segment. Operation 2 may identify an alternate section of the segment. Operation 3 may identify a common section of the segment. For example, the network 302 can be divided into smaller portions through which the number of isolated segments by which the network is formed may be determined. FIG. 3b indicates (in dashed lines) the identified segments 350, 352, 354, 356, 358, 360 of the network 302, as determined in the operations above and according to an example embodiment.

According to example embodiments of the invention, when one of the pipeline components is under maintenance, the pipeline pressures for alternative routing may be determined and an operator may utilize the information to coordinate the pressure in the network. For example, when one of the regulation stations is down (or needs to be taken off line), an alternative source may act as a feeder for demand points, and suitable routes may be displayed. For example, a graphic of the networks, as shown in FIG. 3a or 3b, may be displayed for an operator. In an example embodiment, such a graphic may include color or other indications to indicate which paths are available, and which ones are not. For example, paths that can handle the demand and pressure may be represented as a green color, and paths that may not be able to handle the pressure can be represented as red. Other colors, text, blinking, dashes, visual indicia, tactile indicia, audio indicia, etc., or combinations thereof, may be utilized to indicate available alternative paths and capacity handling abilities of the alternative paths so that routes can be selected.

According to example embodiments, reports may be generated with information about the pipeline infrastructure under different scenarios. For example, and as shown in TABLE 1 below, the report may include the total number of sections, pipe segments, isolating devices, feeding stations, loads served, and critical customers.

TABLE 1

| Fields | Sample values |
| --- | --- |
| Sections | 11 |
| Pipe segments | 36 |
| Isolating devices | 8 |
| Feeding stations | 4 |
| Load served | 100 customers |
| Critical customers | 0 |

According to other example embodiments, reports for portions of the pipeline infrastructure may be generated, as indicated in TABLE 2 below. For example, such a report may display information regarding the number of pipe segments and other components, which are within in a selected portion of the network or infrastructure.

TABLE 2

| Fields | Sample values |
| --- | --- |
| Section Id | 123 |
| Section name | Sec1 |
| Pipe segments | 5 |
| Isolating devices | 3 |
| Feeding stations | 1 |
| Load served | 30 customers |
| Critical customers | 0 |
| Extent Geometry | Bounds |

According to certain example embodiments, reports and/or graphics may be utilized for forecasting. For example, one may wish to know how an available feeding station may be utilized to serve the newly proposed network. If the network can handle the new load, the graphic may show the network in green, for example. According to example embodiments, tables may also be generated for tabulating current loads, pressures, forecasted loads, and various capabilities of the components, as shown in TABLE 3 below. Such information may be utilized for generating graphical maps of the pipeline infrastructure, and for indicating which sections may have the capability to service new loads, etc.

TABLE 3

| Feeding station | Load | Existing Pressure | New load | Capable |
| --- | --- | --- | --- | --- |
| RS1 | 100 | HP | 200 | True |
| RS2 | 100 | HP | 250 | False |
| RS3 | 20 | MP | 0 | True |
| RS4 | 500 | HP | 0 | True |

Figure 4:
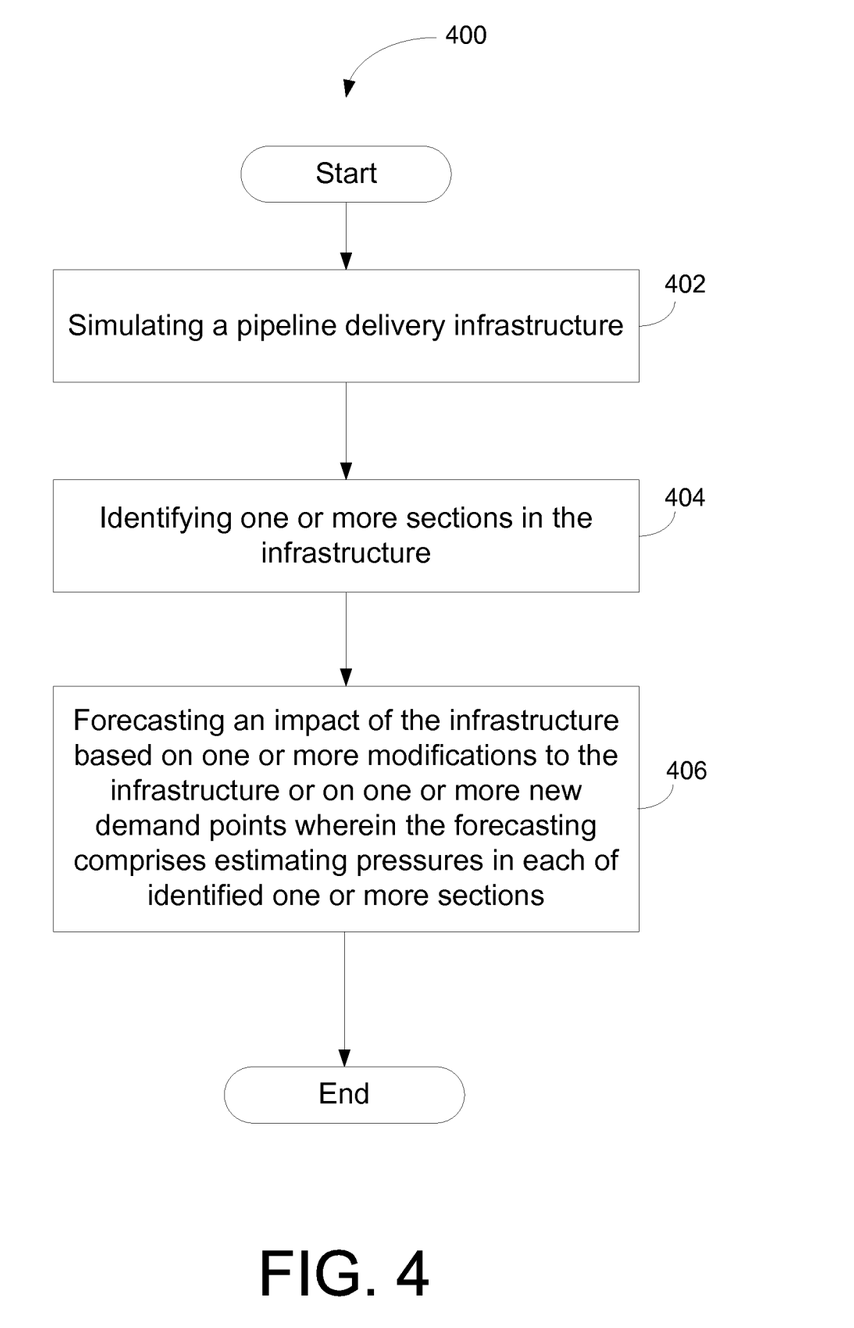
FIG. 4 is a flow diagram of an example method according to an example embodiment of the invention.

An example method 400 for simulating, identifying, and forecasting will now be described with reference to the flowchart of FIG. 4. The method 400 starts in block 402 and can include simulating a pipeline delivery infrastructure. In block 404, the method 400 can include identifying one or more sections in the infrastructure. In block 406, the method 400 can include forecasting an impact of the infrastructure based on one or more modifications to the infrastructure or on one or more new demand points wherein the forecasting comprises estimating pressures in each of identified one or more sections. The method 400 ends after block 406.

According to example embodiments, simulating the pipeline delivery infrastructure (134) includes simulating the actual or planned infrastructure (134) by associating the one or more regulating stations (202) and the at least one demand point (304) with the one or more segments (207) and the plurality of valves (204). In an example embodiment, identifying one or more sections (214) includes tracing the infrastructure (134) from the one or more regulating stations (202) to the at least one demand point (304) or to one or more of the plurality of valves (204), wherein the tracing identifies all of the one or more segments (207) between the regulating stations (202) and the at least one demand point (304) or the one or more of the plurality of valves (204).

In an example embodiment, identifying the one or more sections (214) includes tracing the infrastructure (134) from the plurality of valves (204) to the one or more regulating stations (202) or at least one demand point (304), wherein the tracing identifies all of the one or more segments (207) between the plurality of valves (204) and one or more regulating stations (202) or the at least one demand point (304).

In an example embodiment, identifying the one or more sections (214) includes tracing the infrastructure (134) from a first of the plurality of valves (204) to one or more of the plurality of remaining valves, wherein the tracing identifies all of the one or more segments (207) between the first of the plurality of valves (204) and the one or more of the plurality of remaining valves. In an example embodiment, the method can include reporting data associated with the infrastructure (134) comprising reporting one or more of: number of identified sections (214); number of segments (207); number of isolating devices or valves (204); number of regulating stations (202); number of demand points (340); number of critical demand points (304); or estimated pressures associated with the one or more segments (207).

In an example embodiment, the method can include reporting data associated with the infrastructure (134) including reporting section information comprising one or more of: section identification, number of segments (207) in the section; number of isolating devices or valves (204) in the section; number of regulating stations (202) feeding the section; number of demand points (304) associated with the section; number of critical demand points (304) associated with the section; or estimated pressures associated with the one or more segments (207) associated with the section.

Example embodiments may include system and/or apparatus for planning and optimizing a utility delivery infrastructure (134). The system can include one or more regulating stations (202); at least one demand point (304); one or more sections (214) including one or more segments (207); and a plurality of valves (204). The system or apparatus may include a geographical information system (GIS) comprising one or more processors (106) configured to execute computer executable instructions operable for: simulating the pipeline delivery infrastructure (134); identifying one or more sections (214) in the infrastructure (134); and forecasting an impact of the infrastructure (134) based on one or more modifications to the infrastructure (134) or on one or more new demand points (304) wherein the forecasting comprises estimating pressures in each of identified one or more sections (214).

In an example embodiment, simulating the pipeline delivery infrastructure (134) includes simulating the actual or planned infrastructure (134) by associating the one or more regulating stations (202) and the at least one demand point (304) with the one or more segments (207) and the plurality of valves (204). In an example embodiment, identifying one or more sections (214) comprises tracing the infrastructure (134) from the one or more regulating stations (202) to the at least one demand point (304) or to one or more of the plurality of valves (204), wherein the tracing identifies all of the one or more segments (207) between the regulating stations (202) and the at least one demand point (304) or the one or more of the plurality of valves (204). In an example embodiment, identifying the one or more sections (214) includes tracing the infrastructure (134) from the plurality of valves (204) to the one or more regulating stations (202) or at least one demand point (304), wherein the tracing identifies all of the one or more segments (207) between the plurality of valves (204) and one or more regulating stations (202) or the at least one demand point (304). In an example embodiment, identifying the one or more sections (214) includes tracing the infrastructure (134) from a first of the plurality of valves (204) to one or more of the plurality of remaining valves, wherein the tracing identifies all of the one or more segments (207) between the first of the plurality of valves (204) and the one or more of the plurality of remaining valves. In an example embodiment, the computer executable instructions are operable for: reporting data associated with the infrastructure (134), which may include reporting one or more of: number of identified sections (214); number of segments (207); number of isolating devices or valves (204); number of regulating stations (202); number of demand points (340); number of critical demand points (304); or estimated pressures associated with the one or more segments (207).

In an example embodiment, the computer executable instructions are operable for: reporting data associated with the infrastructure (134), which may include reporting section information comprising one or more of: section identification, number of segments (207) in the section; number of isolating devices or valves (204) in the section; number of regulating stations (202) feeding the section; number of demand points (340) associated with the section; number of critical demand points (304) associated with the section; or estimated pressures associated with the one or more segments (207) associated with the section.

According to example embodiments, certain technical effects can be provided, such as creating certain systems, methods, and apparatus that provide forecasting for planned changes to a pipeline delivery infrastructure. Example embodiments of the invention can provide the further technical effects of providing systems, methods, and apparatus that provide graphical indications of segments or sections of a pipeline delivery infrastructure that are capable for re-routing service.

In example embodiments of the invention, the GIS segmenting system 100 may include any number of hardware and/or software applications that are executed to facilitate any of the operations.

In example embodiments, one or more I/O interfaces may facilitate communication between the GIS segmenting system 100, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the GIS segmenting system 100. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the GIS segmenting system 100 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, embodiments of the invention may include the GIS segmenting system 100 with more or less than the components illustrated in FIG. 1.

Certain embodiments of the invention are described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method, comprising:
   receiving, by one or more processors, data from one or more sensors associated with a pipeline delivery infrastructure;
   simulating, by the one or more processors, the pipeline delivery infrastructure based at least in part on the data received from the one or more sensors associated with the pipeline delivery infrastructure;
   identifying, by the one or more processors, one or more sections in the pipeline delivery infrastructure, wherein each of the one or more sections comprises one or more segments;
   forecasting, by the one or more processors, an impact of the pipeline delivery infrastructure based on one or more modifications to the pipeline delivery infrastructure or on one or more new demand points, wherein the forecasting comprises estimating pressures in each of the one or more sections based at least in part on the data received from the one or more sensors associated with the pipeline delivery infrastructure; and
   determining, by the one or more processors, alternative routing based at least in part on the forecasting, wherein determining said alternative routing comprises:
      identifying a subset of the one or more sections in the pipeline delivery infrastructure that are available for said alternative routing; and
      determining one or more alternative routing paths based on the identified subset of the one or more sections, wherein a user may select at least one of the one or more alternative routing paths to modify the pipeline delivery infrastructure.

2. The method of claim 1, wherein simulating the pipeline delivery infrastructure comprises simulating an actual or planned pipeline delivery infrastructure by associating one or more regulating stations and at least one demand point of the one or more new demand points with the one or more segments and a plurality of valves.

3. The method of claim 1, wherein identifying the one or more sections comprises tracing the pipeline delivery infrastructure from one or more regulating stations to at least one demand point of the one or more new demand points or to one or more of a plurality of valves, wherein the tracing identifies all of the one or more segments between the one or more regulating stations and the at least one demand point or the one or more of the plurality of valves.

4. The method of claim 1, wherein identifying the one or more sections comprises tracing the pipeline delivery infrastructure from a plurality of valves to one or more regulating stations or at least one demand point of the one or more new demand points, wherein the tracing identifies all of the one or more segments between the plurality of valves and the one or more regulating stations or the at least one demand point.

5. The method of claim 1, wherein identifying the one or more sections comprises tracing the pipeline delivery infrastructure from a first of a plurality of valves to one or more of a plurality of remaining valves, wherein the tracing identifies all of the one or more segments between the first of the plurality of valves and the one or more of the plurality of remaining valves.

6. The method of claim 1, further comprising reporting the data received from the one or more sensors associated with the pipeline delivery infrastructure comprising reporting one or more of: number of identified sections; number of segments in each of the one or more sections; number of isolating devices or valves; number of regulating stations; number of demand points; number of critical demand points; or the estimated pressures in each of the one or more sections.

7. The method of claim 1, further comprising reporting the data received from the one or more sensors associated with the pipeline delivery infrastructure comprising reporting section information comprising one or more of: section identification, number of segments in each of the one or more sections; number of isolating devices or valves in each of the one or more sections; number of regulating stations feeding each of the one or more sections; number of demand points associated with each of the one or more sections; number of critical demand points associated with each of the one or more sections; or the estimated pressures in each of the one or more sections.

8. A system for planning and optimizing a utility delivery infrastructure, the system comprising:
   one or more regulating stations;
   at least one demand point;
   one or more sections, wherein each of the one or more sections comprises one or more segments;
   a plurality of valves; and
   a geographical information system (GIS) comprising one or more processors configured to execute computer executable instructions operable for:
      receiving data from one or more sensors associated with a pipeline delivery infrastructure;

simulating the pipeline delivery infrastructure based at least in part on the data received from the one or more sensors associated with the pipeline delivery infrastructure;

identifying the one or more sections and the one or more segments for each of the one or more sections in the pipeline delivery infrastructure;

forecasting an impact of the pipeline delivery infrastructure based on one or more modifications to the pipeline delivery infrastructure or on one or more new demand points, wherein the forecasting comprises estimating pressures in each of the one or more sections based at least in part on the data received from the one or more sensors associated with the pipeline delivery infrastructure; and determining alternative routing based at least in part on the forecasting, wherein determining said alternative routing comprises:

identifying a subset of the one or more sections in the pipeline delivery infrastructure that are available for said alternative routing; and determining one or more alternative routing paths based on the identified subset of the one or more sections, wherein a user may select at least one of the one or more alternative routing paths to modify the pipeline delivery infrastructure.

9. The system of claim 8, wherein simulating the pipeline delivery infrastructure comprises simulating an actual or planned pipeline delivery infrastructure by associating the one or more regulating stations and at least one new demand point of the one or more new demand points with the one or more segments and the plurality of valves.

10. The system of claim 8, wherein identifying the one or more sections comprises tracing the pipeline delivery infrastructure from the one or more regulating stations to at least one new demand point of the one or more new demand points or to one or more of the plurality of valves, wherein the tracing identifies all of the one or more segments between the one or more regulating stations and the at least one new demand point or the one or more of the plurality of valves.

11. The system of claim 8, wherein identifying the one or more sections comprises tracing the pipeline delivery infrastructure from the plurality of valves to the one or more regulating stations or at least one new demand point of the one or more new demand points, wherein the tracing identifies all of the one or more segments between the plurality of valves and the one or more regulating stations or the at least one new demand point.

12. The system of claim 8, wherein identifying the one or more sections comprises tracing the pipeline delivery infrastructure from a first of the plurality of valves to one or more of a plurality of remaining valves, wherein the tracing identifies all of the one or more segments between the first of the plurality of valves and the one or more of the plurality of remaining valves.

13. The system of claim 8, wherein the computer executable instructions are operable for: reporting the data received from the one or more sensors associated with the pipeline delivery infrastructure comprising reporting one or more of: number of identified sections; number of segments in each of the one or more sections; number of isolating devices or valves; number of regulating stations; number of demand points; number of critical demand points; or the estimated pressures in each of the one or more sections.

14. The system of claim 8, wherein the computer executable instructions are operable for:

reporting the data received from the one or more sensors associated with the pipeline delivery infrastructure comprising reporting section information comprising one or more of: section identification, number of segments in each of the one or more sections; number of isolating devices or valves in each of the one or more sections; number of regulating stations feeding each of the one or more sections; number of demand points associated with each of the one or more sections; number of critical demand points associated with each of the one or more sections; or the estimated pressures in each of the one or more sections.

15. An apparatus for planning and optimizing a utility delivery infrastructure, the apparatus comprising a geographical information system (GIS) comprising one or more processors configured to execute computer executable instructions operable for:

receiving data from one or more sensors associated with a pipeline delivery infrastructure;

simulating the pipeline delivery infrastructure based at least in part on the data received from the one or more sensors associated with the pipeline delivery infrastructure, wherein the simulated pipeline delivery infrastructure comprises one or more regulating stations, at least one demand point, one or more sections each comprising one or more segments, and a plurality of valves, wherein at least two valves of the plurality of valves are connected to each of the one or more regulating stations;

identifying the one or more sections in the pipeline delivery infrastructure;

estimating pressures in each of the one or more sections based at least in part on pressure provided by the one or more regulating stations and by states of the plurality of valves;

forecasting an impact of the pipeline delivery infrastructure based on one or more modifications to the pipeline delivery infrastructure or on one or more new demand points based at least in part on the data received from the one or more sensors associated with the pipeline delivery infrastructure;

determining alternative routing based at least in part on the forecasting, wherein determining said alternative routing comprises:

identifying a subset of the one or more sections in the pipeline delivery infrastructure that are available for said alternative routing; and determining one or more alternative routing paths based on the identified subset of the one or more sections, wherein a user may select at least one of the one or more alternative routing paths to modify the pipeline delivery infrastructure; and providing the data received from the one or more sensors associated with the pipeline delivery infrastructure based at least in part on one or more of the simulating, the identifying, the estimating, the forecasting, or the determining.

16. The apparatus of claim 15, wherein simulating the pipeline delivery infrastructure comprises simulating an actual or planned pipeline delivery infrastructure by associating the one or more regulating stations and at least one new demand point of the one or more new demand points with the one or more segments and the plurality of valves.

17. The apparatus of claim 15, wherein identifying the one or more sections comprises tracing the pipeline delivery infrastructure from the one or more regulating stations to at least one new demand point of the one or more new demand points or to one or more of the plurality of valves, wherein the tracing identifies all of the one or more segments between the one or more regulating stations and the at least one new demand point or the one or more of the plurality of valves.

18. The apparatus of claim 15, wherein identifying the one or more sections comprises tracing the pipeline delivery infrastructure from the plurality of valves to the one or more regulating stations or at least one new demand point of the one or more new demand points, wherein the tracing identifies all of the one or more segments between the plurality of valves and the one or more regulating stations or the at least one new demand point.

19. The apparatus of claim 15, wherein identifying the one or more sections comprises tracing the pipeline delivery infrastructure from a first of the plurality of valves to one or more of a plurality of remaining valves, wherein the tracing identifies all of the one or more segments between the first of the plurality of valves and the one or more of the plurality of remaining valves.

20. The apparatus of claim 15, wherein providing the data received from the one or more sensors associated with the pipeline delivery infrastructure comprises reporting one or more of: number of identified sections; number of segments in each of the one or more sections; number of isolating devices or valves; number of regulating stations; number of demand points; number of critical demand points; or the estimated pressures in each of the one or more sections, or wherein providing the data received from the one or more sensors associated with the pipeline delivery infrastructure comprises reporting section information comprising one or more of: section identification, number of segments in each of the one or more sections; number of isolating devices or valves in each of the one or more sections; number of regulating stations feeding each of the one or more sections; number of demand points associated with each of the one or more sections; number of critical demand points associated with each of the one or more sections; or the estimated pressures in each of the one or more sections.

\* \* \* \* \*

UNITED STATES PATENT AND TRADEMARK OFFICE
CERTIFICATE OF CORRECTION

PATENT NO. : 8,938,379 B2
APPLICATION NO. : 13/194467
DATED : January 20, 2015
INVENTOR(S) : Andoji et al.

Page 1 of 1

It is certified that error appears in the above-identified patent and that said Letters Patent is hereby corrected as shown below:

ON THE TITLE PAGE

On Page 2, in Item (56), under "OTHER PUBLICATIONS", in Column 1, Line 2, delete "Design: Retrieved:" and insert -- Design: Class # 1010, Retrieved: --, therefor.

Signed and Sealed this
Twenty-sixth Day of January, 2016

Michelle K. Lee
*Director of the United States Patent and Trademark Office*